US 6,719,294 B2

(12) United States Patent
Nguyen et al.

(10) Patent No.: US 6,719,294 B2
(45) Date of Patent: Apr. 13, 2004

(54) BATHROOM FIXTURE GASKET APPARATUS AND METHOD

(75) Inventors: Jack T. Nguyen, Mission Viejo, CA (US); Christopher A. Coppock, Laguna Niguel, CA (US); Steven E. Maple, Mission Viejo, CA (US); Troy A. Bell, Irvine, CA (US); Kevin J. Doverspike, Irvine, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 234 days.

(21) Appl. No.: 09/776,350

(22) Filed: Feb. 2, 2001

(65) Prior Publication Data

US 2001/0045710 A1 Nov. 29, 2001

Related U.S. Application Data

(60) Provisional application No. 60/180,465, filed on Feb. 4, 2000.

(51) Int. Cl.[7] ........................ F16L 21/025; F16L 21/05; F03D 11/16; F03D 11/00
(52) U.S. Cl. ....................... 277/314; 277/603; 277/604; 4/252.5; 285/56; 285/344
(58) Field of Search ............................... 4/252.5, 252.6; 285/56–60, 344; 277/314, 316, 602, 603, 607, 609, 615, 616, 625, 628, 630, 637, 634

(56) References Cited

U.S. PATENT DOCUMENTS

| 696,183 A | 3/1902 | McAuliffe |
| 2,152,719 A | 4/1939 | Williams |
| 2,427,431 A | 9/1947 | Weiland |
| 2,479,837 A | 8/1949 | Hollaender |
| 3,037,212 A | 6/1962 | Kleinhof |
| 3,238,538 A | 3/1966 | Turner |
| 3,349,412 A | 10/1967 | Schwartz et al. |
| 3,400,411 A | 9/1968 | Harvey |
| 3,409,918 A | * 11/1968 | Gaddy .......................... 4/252.5 |
| 3,568,222 A | 3/1971 | Gantzert |
| D255,481 S | 6/1980 | Moore |
| 4,470,162 A | * 9/1984 | Marshall ...................... 4/252.5 |
| 4,482,161 A | 11/1984 | Izzi, Sr. |
| 4,722,556 A | 2/1988 | Todd |
| 4,827,539 A | * 5/1989 | Kiziah ......................... 4/252.4 |
| 4,832,375 A | * 5/1989 | Emberson ...................... 285/4 |
| 4,984,308 A | 1/1991 | Handal |
| 5,185,890 A | 2/1993 | Dismore et al. |
| 5,291,619 A | 3/1994 | Adorjan |
| 5,608,922 A | 3/1997 | Lewis |
| 6,070,910 A | * 6/2000 | Hodges ........................ 285/2 |
| 6,332,632 B1 | * 12/2001 | Hodges ....................... 285/56 |

FOREIGN PATENT DOCUMENTS

CA 665797 6/1963

\* cited by examiner

*Primary Examiner*—Anthony Knight
*Assistant Examiner*—Vishal Patel
(74) *Attorney, Agent, or Firm*—Richard L. Myers; Myers Dawes Andras & Sherman LLP

(57) ABSTRACT

A gasket assembly includes an upper housing forming a seal with the outlet of a bathroom fixture, and a lower housing forming a seal with a sewer pipe. The lower housing has an outer surface extending along an axis and a toroidal gasket disposed in sealing relationship with the outer surface and the sewer pipe. To accommodate larger sewer pipes, the outer surface can be formed on an adapter and a second gasket provided to form a seal with the adapter. In an associated method for mounting the gasket assembly, the gasket is rolled axially in a continuous sealing relationship with the lower housing.

13 Claims, 20 Drawing Sheets

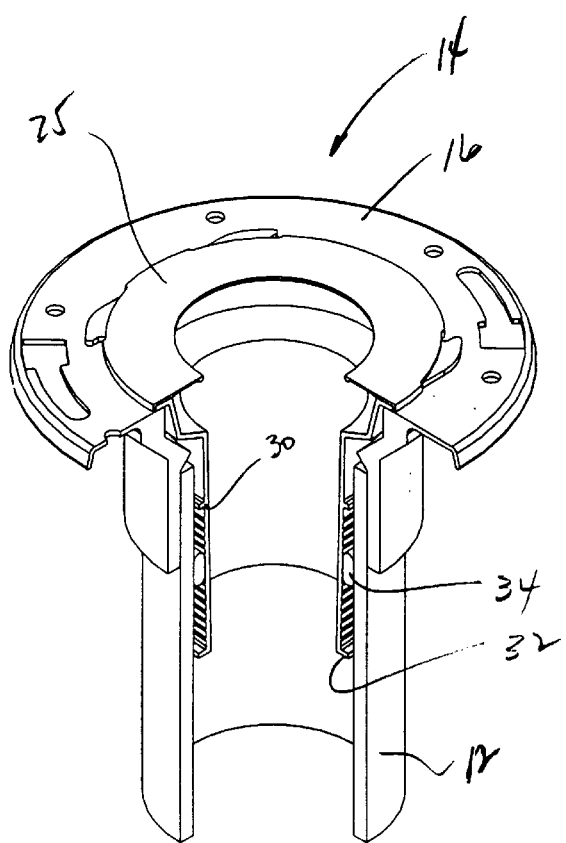
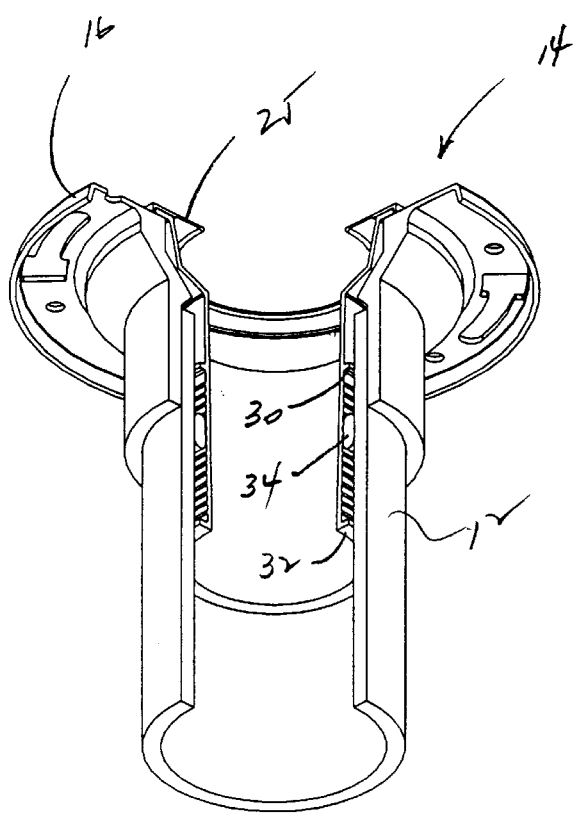
FIGURE 2-A
FIGURE 2-B

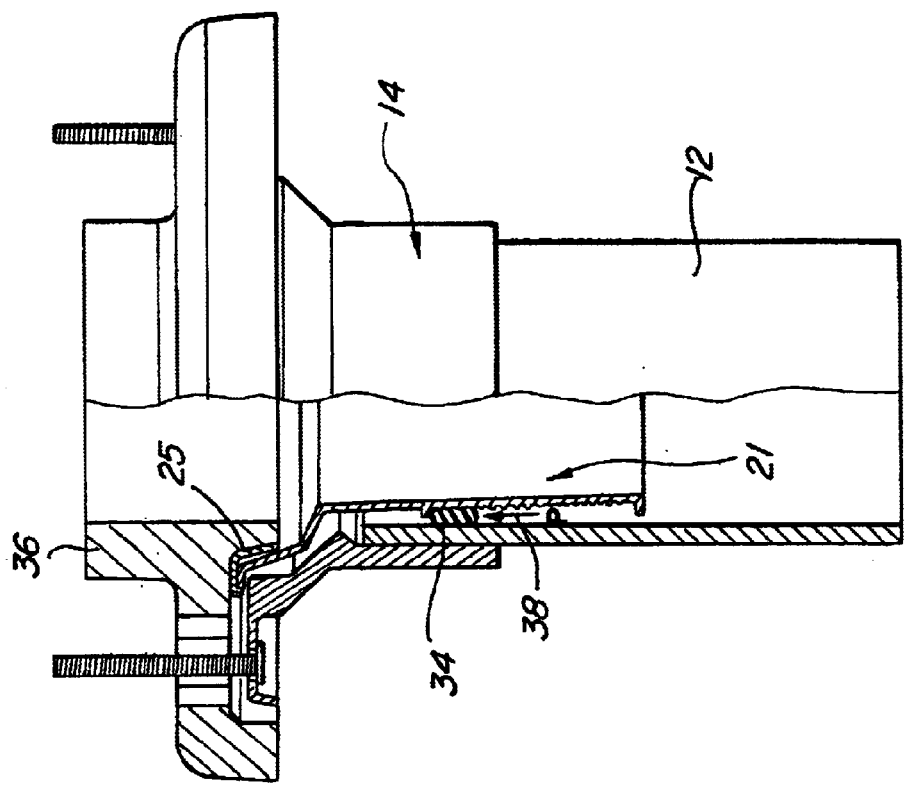
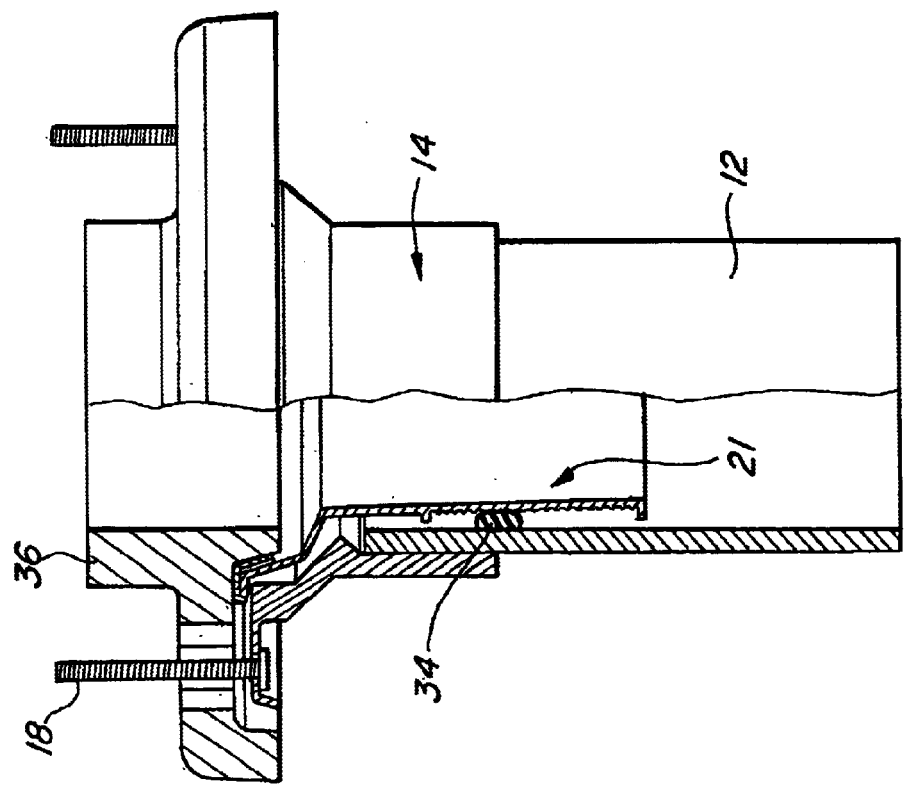

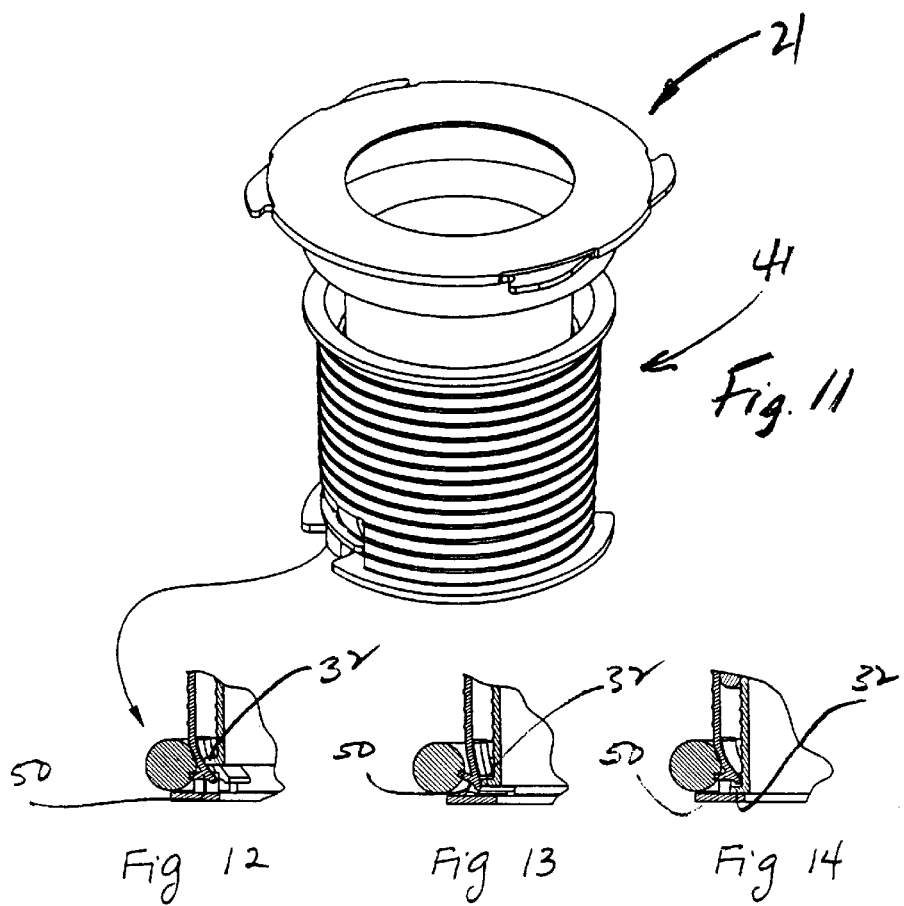

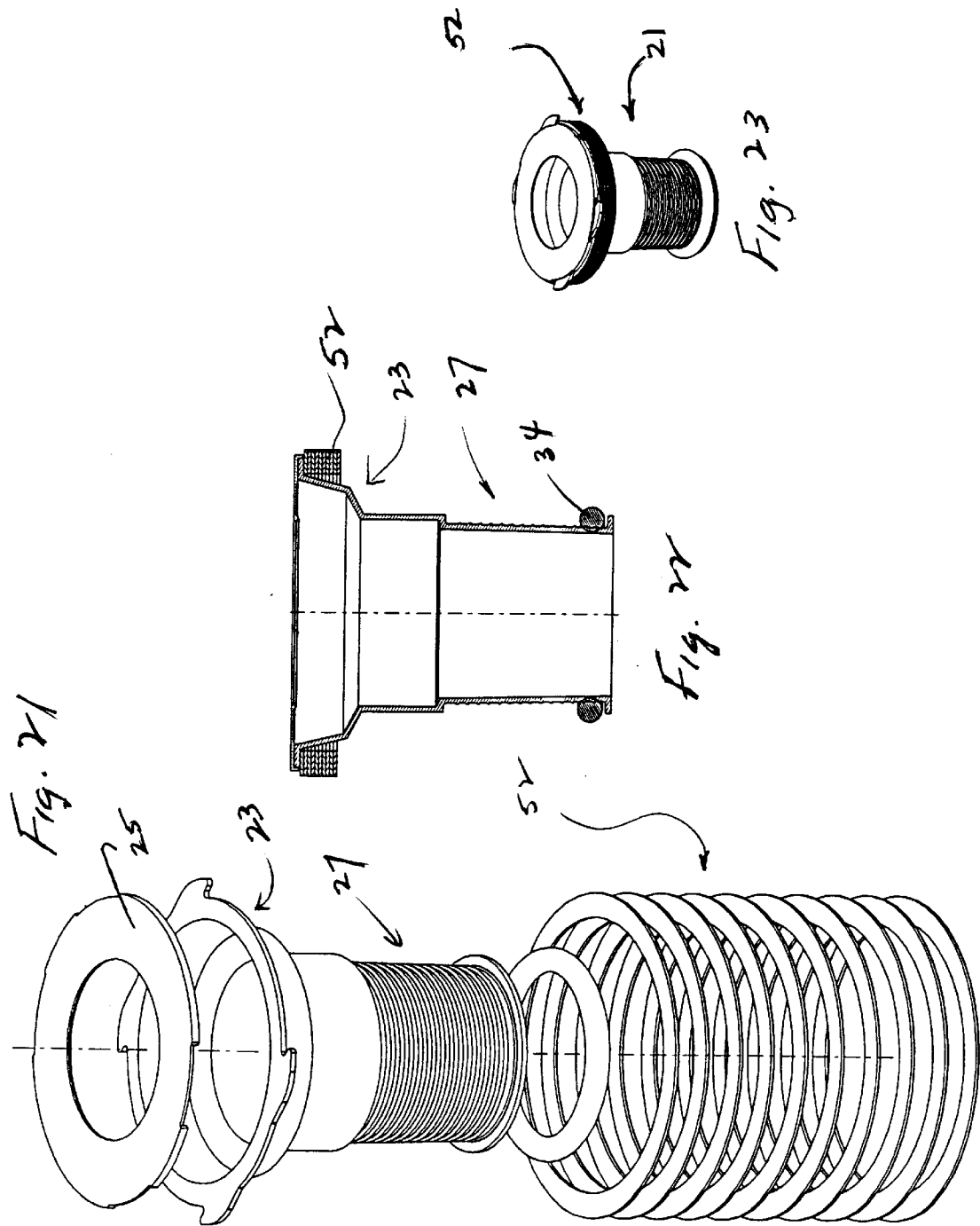

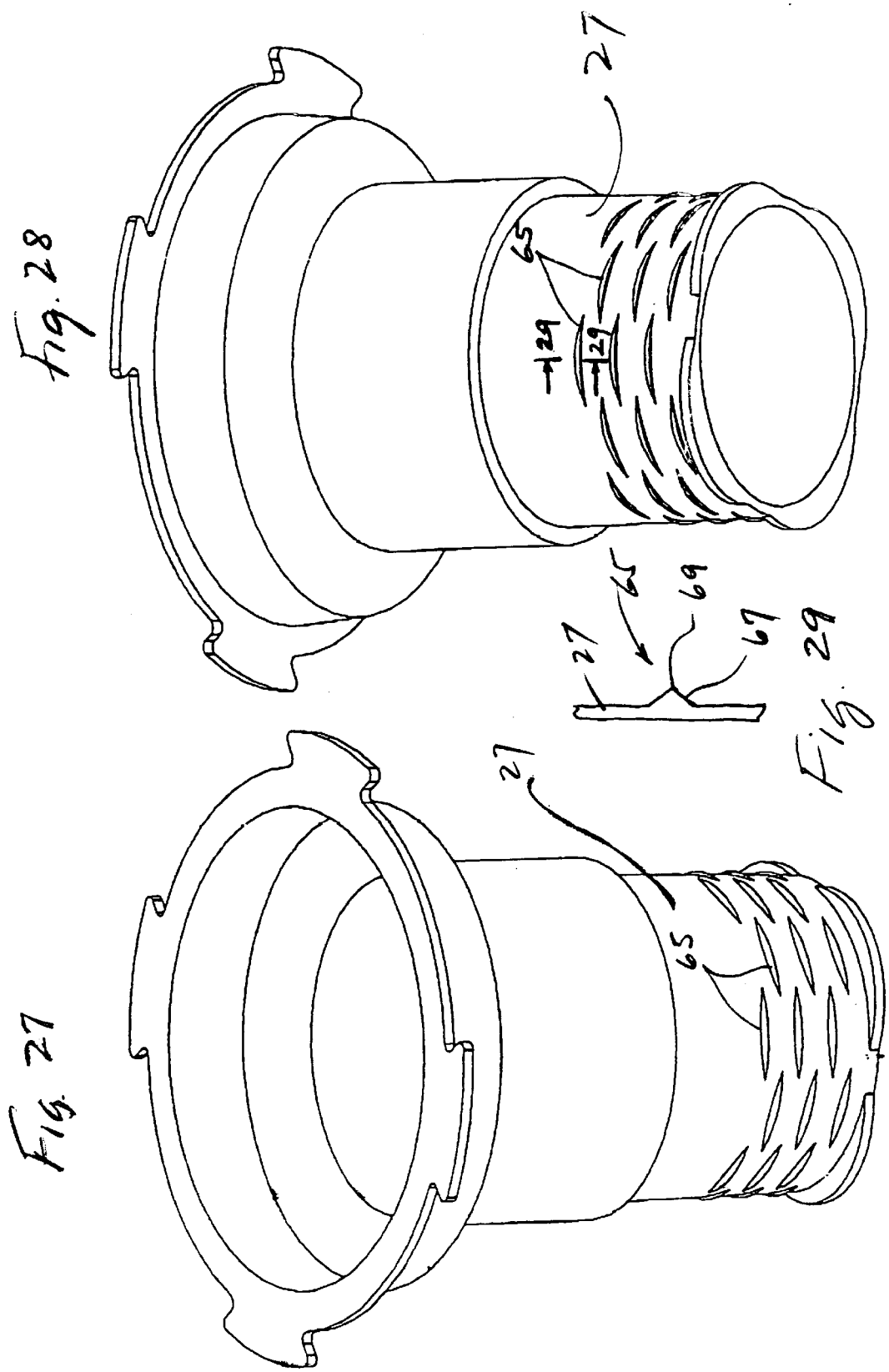

BATHROOM FIXTURE GASKET APPARATUS AND METHOD

CROSS REFERENCE TO RELATED APPLICATIONS

This is a non-provisional application claiming the priority of provisional application Serial No. 60/180,465 filed on Feb. 4, 2000.

BACKGROUND OF THE INVENTION

1. Field of the Invention

This invention relates generally to bathroom fixtures and associated hardware, and more specifically to gasket assemblies adapted to form a sealing relationship between the fixture and a sewer pipe.

2. Discussion of the Prior Art

The installation of a toilet in sealing engagement with the sewer pipe has traditionally been accomplished with a wax ring. The ring is difficult to install because it is very messy and sensitive to temperatures. While the ring works well at room temperature, cold temperatures make the ring hard and prone to cracking while hot temperatures tend to make the wax melt. The wax ring does not adapt well to uneven floors which usually must be accommodated with multiple wax rings and repeated installation attempts. The wax rings are not adjustable in place and are not capable of withstanding positive fluid pressures.

Another type of installation involves an adapter having a housing with multiple annular channels, each having a different diameter. A single ring gasket is mounted in one of the channels prior to installation. This ring gasket forms a seal with the inner surface of the sewer pipe. Variation in sewer pipe diameters are accompanied by mounting the ring gasket in a particular one of the annular channels. The annular channels tend to make the ring gasket perfectly round resulting in insufficient sealing with pipes. For example, when the sewer pipe is rusted or corroded, the inner surface is generally uneven and the ring gasket is incapable of forming an adequate seal.

Flexible sealing flanges are provided in a third type of installation. These flanges are not capable of withstanding positive fluid pressures.

SUMMARY OF INVENTION

These deficiencies of the prior art are overcome with the present invention which includes a bathroom fixture gasket assembly. The advantages of this assembly applied to any fixture interfacing with a sewer pipe, but will be particularly appreciated in the mounting of a toilet bowl. The gasket assembly in a preferred embodiment has a lower section with an outer surface and a generally constant diameter. When operatively disposed, this surface is spaced a particular distance from the inside surface of the sewer pipe. A gasket ring carried by the lower housing is movable generally axially along the cylindrical surface and forms a seal both with the cylindrical surface and the inside surface of the sewer pipe. The gasket ring is provided with a cross-section which is greater than the particular distance separating the inner surface of the sewer pipe and the outer cylindrical surface of the lower housing.

As the gasket assembly is inserted into the sewer pipe, the gasket ring rolls along the outer cylindrical surface as it maintains a sealing relationship between the sewer pipe and the lower housing. The significant cross-sectional diameter of the gasket ring provides a large area of surface contact that enhances the sealing relationship with both surfaces, and also facilitates the sealing relationship with irregular surfaces. Accordingly, the assembly of the present invention can withstand positive fluid pressures which can accommodate a less than perfect environment. Angled floors and rusted sewer pipes can be accommodated with substantially no adverse effect. The gasket assembly allows for adjustments of the fixture during the installation process. Removal and installation of the fixture are not required in order to make adjustments in the gasket assembly.

In one aspect of the invention, a gasket assembly is adapted to form a sealing relationship between a fixture outlet, such as a toilet horn, and a sewer pipe. An upper housing of the assembly forms a seal with the toilet horn. A lower housing having an outer surface extends along an axis and is sized and configured for insertion into the sewer pipe. A gasket is disposed in sealing engagement with the outer surface of the lower housing and is adapted to form a seal with the inner surface of the sewer pipe. This gasket is moveable along the outer surface when the lower housing is inserted into the sewer pipe.

In another aspect of the invention, a gasket assembly includes an upper housing adapted to form a seal with the fixture outlet and a lower housing coupled to the upper housing. A first cylinder is included in the lower housing and has an outer surface with a generally constant diameter. A first gasket is disposed in moveable relationship with the outer surface of the first cylinder and adapted to form a seal with the inner surface of the sewer pipe. A second cylinder having an outer surface is disposed inwardly of the first cylinder. A second gasket is disposed in a sealing relationship with the inner surface of the first cylinder and the outer surface of the second cylinder.

In another aspect, the invention includes a method for connecting a bathroom fixture to a sewer pipe. The method includes the steps of providing a gasket assembly with an upper housing and a lower housing, each disposed along an axis, and a gasket disposed on the lower housing. The gasket assembly is mounted on the sewer pipe contacting the sewer pipe with the gasket. During this mounting step, the gasket moves axially in a continuous sealing relationship with the lower housing. Finally the bathroom fixture is placed in a sealing relationship with the upper housing of the toilet bowl gasket assembly.

In a further aspect, the invention comprises a combination including a bathroom fixture with an outlet pipe, a sewer pipe having an inner surface, and a gasket assembly having an upper housing in sealing engagement with the outlet pipe. A lower housing of the gasket assembly has an outer surface. Seal means is disposed between this outer surface of the lower housing and the inner surface of the sewer pipe. The seal means has properties for moving relative to the outer surface of the lower housing during insertion of the gasket assembly into the sewer pipe.

These and other features and advantages of the invention will become more apparent with a description of preferred embodiments and reference to the associated drawings.

DESCRIPTION OF THE DRAWINGS

FIG. 2A is a top side perspective view of the bowl gasket assembly operatively disposed in the sewer pipe;

FIG. 2B is a bottom side perspective view of the bowl gasket assembly operatively disposed in the sewer pipe;

FIG. 7 is a side elevation view partially in section showing a final step in the installation of the toilet bowl and bowl gasket assembly relative to the sewer pipe;

FIG. 8 is a side elevation view partially in section similar to FIG. 7 and indicating the final disposition of a roller seal under pressure between the bowl gasket assembly and the sewer pipe;

FIG. 11 is a top side perspective view of the bowl gasket assembly with the adapter ring of FIG. 10;

FIG. 12 is an axial cross-section view illustrating an initial step in the process for mounting the adapter ring on the three inch housing;

FIG. 13 is a cross-section view similar to FIG. 12 and illustrating an intermediate step of a process for mounting the adapter ring on the three inch housing;

FIG. 14 is a cross-section view similar to FIG. 13 and illustrating a final step in the process for mounting the adapter ring on the three inch housing;

FIG. 21 is a top side perspective view of a further embodiment of the bowl gasket assembly including a plurality of shims or spacers;

FIG. 22 is an axial cross-section view of the bowl gasket assembly of FIG. 21 illustrating the spacers operatively disposed about the upper housing of the bowl gasket assembly;

FIG. 23 is a top side perspective view the spacers operatively disposed on the bowl gasket assembly;

FIG. 27 is a top side perspective view of a further embodiment of the bowl gasket assembly having a plurality of bumps facilitating rotation of a roller seal;

FIG. 28 is a bottom side perspective view of the bowl gasket assembly of FIG. 27; and FIG. 29 is a cross sectional view taken along lines 29—29 of FIG. 28.

DESCRIPTION OF PREFERRED EMBODIMENTS AND BEST MODE OF THE INVENTION

Figure 1:
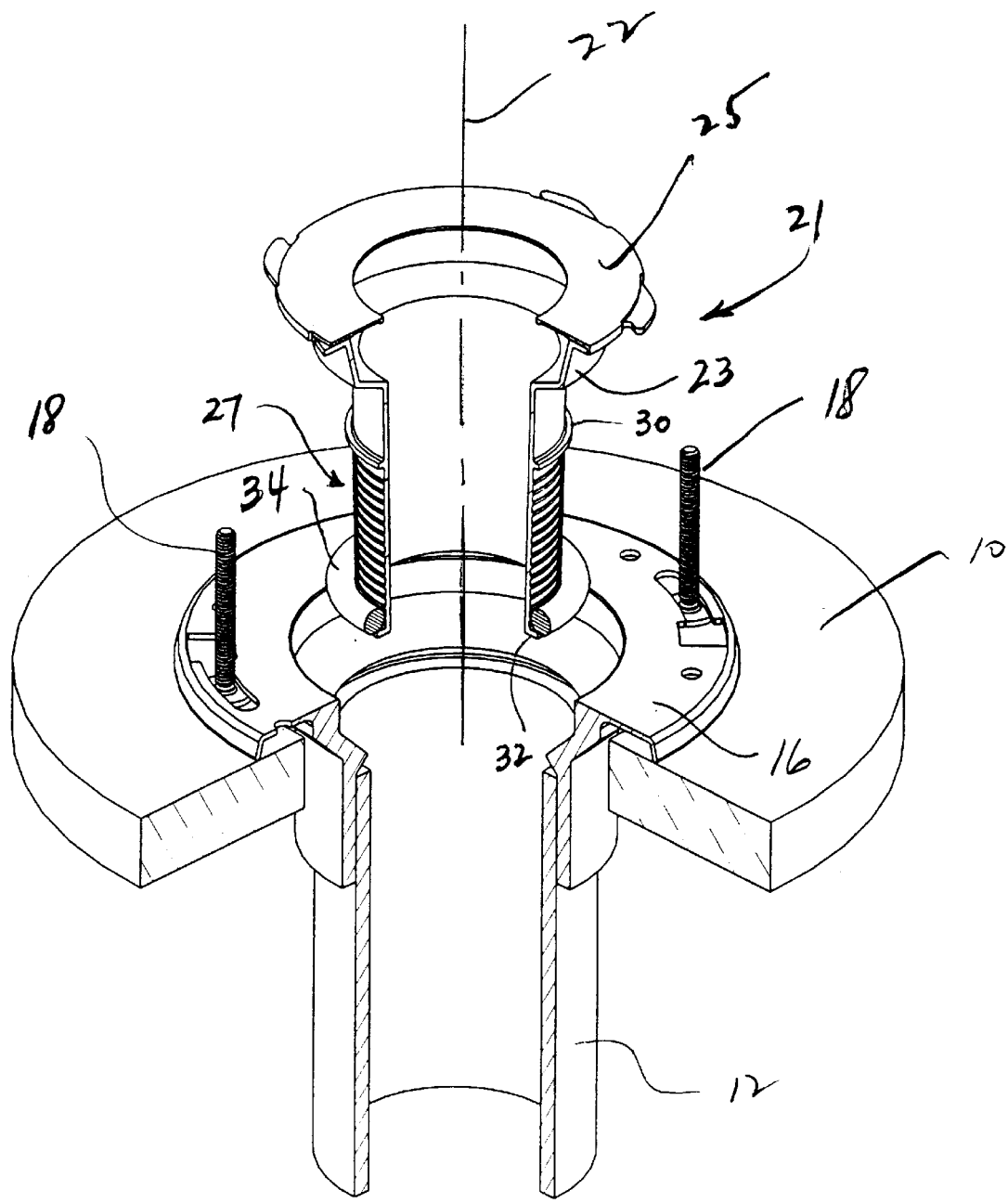
FIG. 1 is a top side perspective view partially in section, of a floor sewer pipe and bowl gasket assembly of the present invention.

A toilet bowl (not shown) is typically mounted on a floor 10 in flushing communication with a drain or sewer pipe 12. Commonly, the sewer pipe 12 is held in position relative to the floor by an adapter 14 which includes a flange 16 and hold-down bolts 18. Depending on the relative size of the toilet outlet pipe (commonly referred to as a toilet horn) and sewer pipe 12, a bowl gasket assembly 21 will typically be provided to facilitate this mounting process and establish appropriate seals between the toilet horn and the sewer pipe 12. A bowl gasket assembly 21 of the present invention is illustrated in FIG. 1 and designated by the reference numeral 21. This assembly 21 has an axis 22 with a top housing 23 carrying a top gasket 25. The gasket 25 is disposed in a radial plane and adapted to form a gasket seal with the toilet horn.

The bowl gasket assembly 21 also includes a lower housing 27 in the general shape of a cylinder. The cylinder is formed with a shoulder 30 and a flange 32 which extend outwardly in a widely spaced relationship along the axis 22. A toroidal gasket ring 34 is free to move axially typically by rolling along the lower housing 27.

The bowl gasket assembly 21 is illustrated in an operative disposition relative to the adapter 14 and sewer pipe 12 in the perspective views of FIGS. 2A and 2B. In both of these views the gasket ring 34 is shown to be operatively disposed generally between the shoulder 30 and the projections 32.

Figure 3:
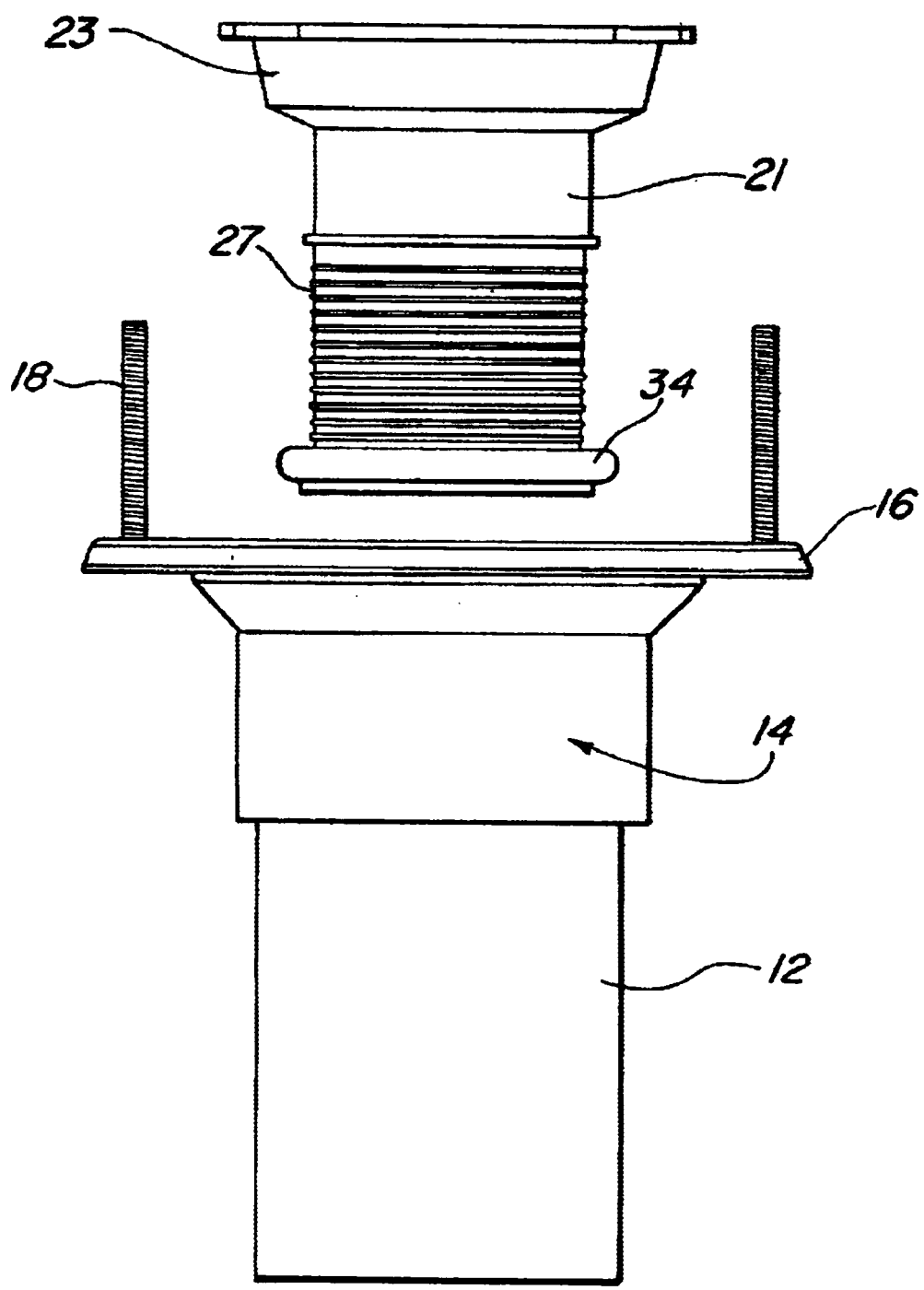
FIG. 3 is a side elevation view of the bowl gasket assembly immediately prior to installation.
Figure 4:
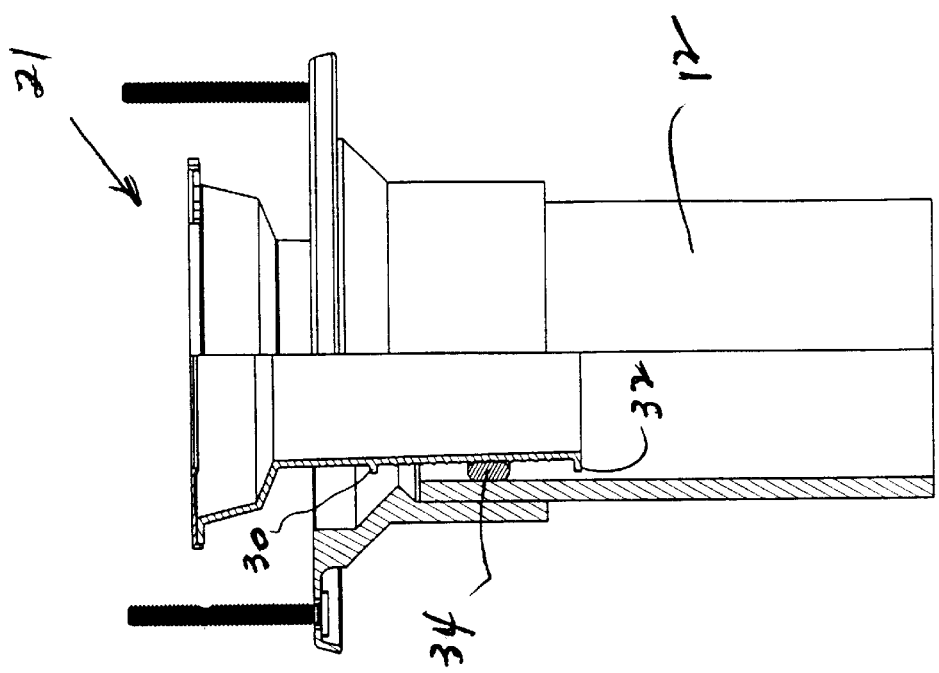
FIG. 4 is a side elevation view partially in section of a preliminary step in the process for installing the bowl gasket assembly.
Figure 5:
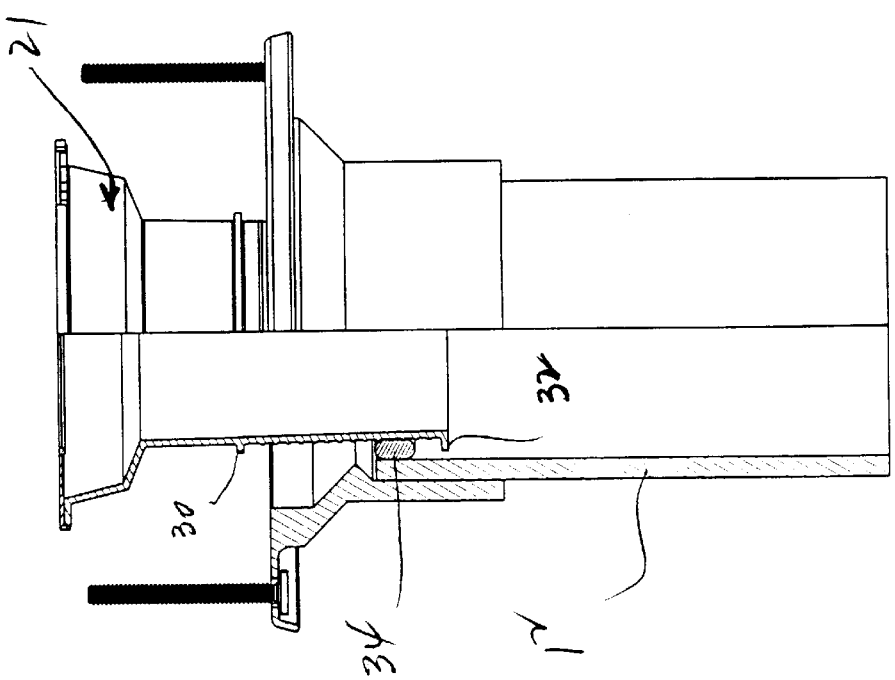
FIG. 5 is a side elevation view partially in section of an intermediate step in the process for installing the bowl gasket assembly.

A pre-installation position is illustrated in FIG. 3 with the bowl gasket assembly 21 disposed over the adapter 14 and associated sewer pipe 12. Intermediate positions of installation are illustrated in FIGS. 4 and 5 with the bowl gasket assembly 21 being progressively inserted into the sewer pipe 12. It will be noted that the progressive insertion of the bowl gasket assembly 21 into the sewer pipe 12 is accompanied with the rolling translation of the gasket ring 34 from the projections 32 toward the shoulder 30.

Figure 6:
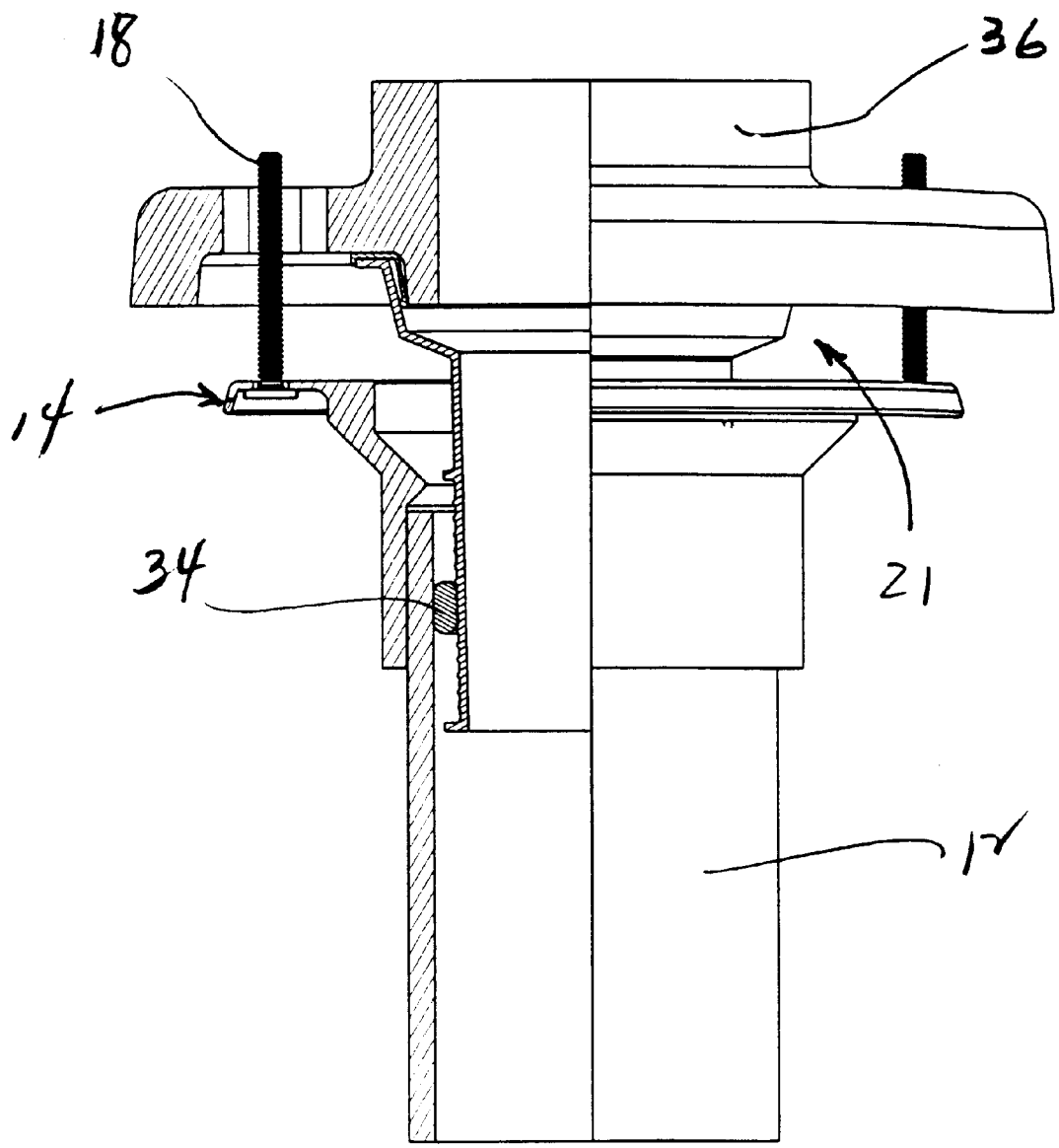
FIG. 6 is a side elevation view partially in section of a toilet bowl being installed relative to the bowl gasket assembly and sewer pipe.

After the bowl gasket assembly 21 is at least partially inserted into the sewer pipe 12, the toilet, and more specifically the toilet horn 36, can be installed on the bowl gasket assembly 21 as illustrated in FIG. 6. Holes in the toilet horn 36 are to be registered with the hold-down bolts 18 of the adapter 14. The installation is completed when the toilet horn 36 is fully seated on the bowl gasket assembly 21 and the bowl gasket assembly 21 is fully seated in the sewer pipe 12, as illustrated in FIG. 7. In this position, the gasket ring 34 forms a seal between the lower housing 27 and the bowl gasket assembly 21. In this position, the gasket ring 34 forms a seal between the sewer pipe 12 and the bowl gasket assembly 21. After this final mounting step has been achieved, the system can be pressurized, for example by a pressure P shown by an arrow 38 in FIG. 8. This pressure P against the gasket ring 34 will tend to move the ring 34 upward until it is stopped by the shoulder 30. The top gasket 25 similarly forms a seal between the bowl gasket assembly 21 and the toilet horn 36 as illustrated in FIG. 8. It will be noted that the pressure P on the gasket ring 34 increases the radial pressure of the gasket ring 34 against both the lower housing 27 and the sewer pipe 12.

In the embodiment of FIG. 1, the lower housing 27 comprises a cylinder having an outer surface and the gasket ring 34 is disposed in sealing engagement between the outer surface of the cylinder and the inner surface of the sewer pipe 12.

Figure 9:
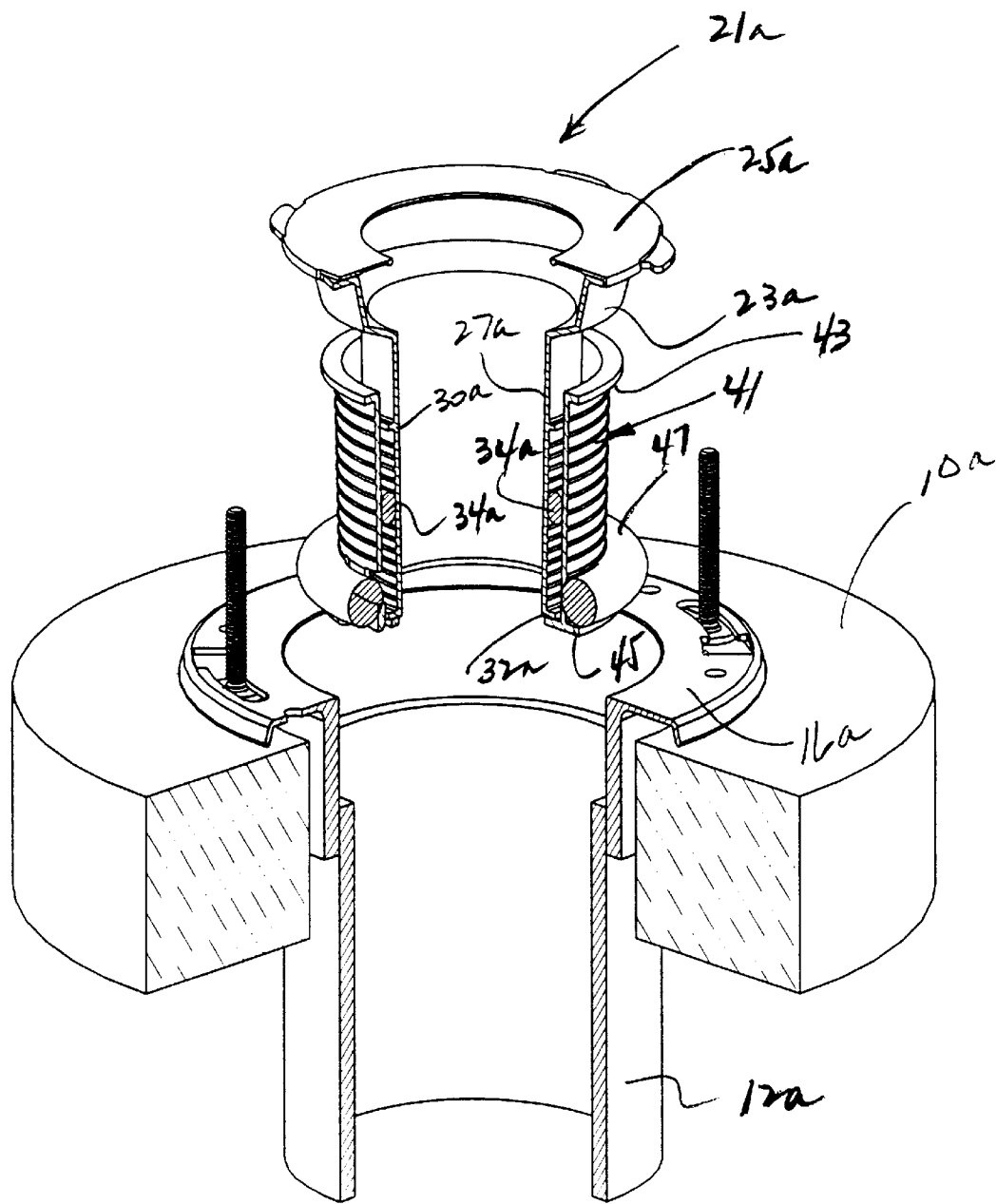
FIG. 9 is a top side perspective view of a further embodiment of the bowl gasket assembly adapted for use with a four inch sewer pipe.

A further embodiment of the invention is illustrated in FIG. 9 where elements of similar structure are designated with the same reference numeral followed by the lower case letter "a." For example, in this embodiment, the bowl gasket assembly is designated by the reference numeral 21a, with a top housing 23a, top gasket assembly 25a, lower housing 27a, and gasket ring 34a. In this embodiment, the bowl gasket assembly 21a is provided with an adapter ring 41 that is sized and configured for operation with a sewer pipe 12a which may have a relatively larger diameter, such as four inches. This adapter ring 41 is similar to the lower housing 27a in that it includes a shoulder 43 similar to the shoulder 30a, projections 45 similar to the projections 32a, and an adapter gasket ring 47 similar to the gasket ring 34a. In this embodiment, the inside surface of the adapter ring 41 functions as the inside surface of the sewer pipe 12 in the previous embodiment. Thus the gasket ring 34a forms a seal between the housing 27a and the inside surface of the adapter ring 41.

Figure 10:
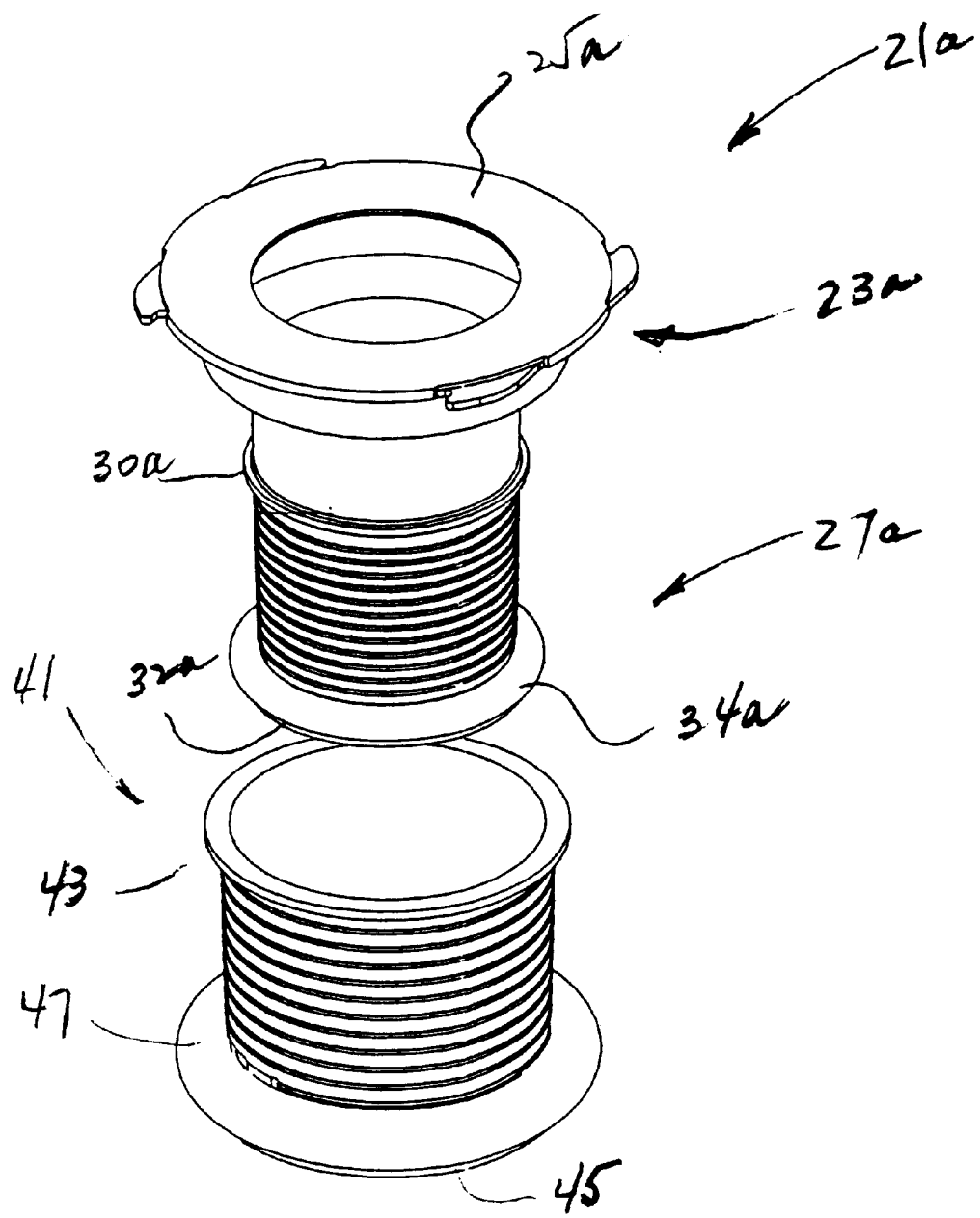
FIG. 10 is a top side perspective view of a bowl gasket assembly with a three inch housing and a four inch adapter ring.

In this embodiment, the adapter ring 41 functions in a manner similar to that of housing 27a as the adapter gasket ring 47 rolls along the cylindrical adapter ring 41 to form a seal between the adapter ring 41 and the inside surface of the larger sewer pipe 12a. These elements of the bowl gasket assembly 21a and adapter ring 41 are perhaps best illustrated in the exploded view of FIG. 10.

In this embodiment of FIG. 9, the lower housing 27a includes an inner cylinder with an outer surface; and the adapter ring 41 which forms an outer cylinder having an inner surface and an outer surface. When the outer cylinder or adapter ring 41 is operatively disposed over the inner cylinder, the gasket ring 34a is disposed in sealing engagement with the outer surface of the inner cylinder and the inner surface of the outer cylinder. The gasket ring 47 is disposed in sealing engagement with the outer surface of the outer cylinder or adapter ring 41 and the inner surface of the sewer pipe 12a.

In the mounting process associated with the embodiment of FIG. 9, the bowl gasket assembly 21 is initially mounted in the adapter ring 41 as illustrated in FIG. 11. In this part of the process, the gasket ring 34 functions in the manner previously discussed to form a seal between the bowl gasket assembly 21 and the adapter ring 41. In order to place the bowl gasket assembly 21 and adapter ring 41 in a fixed relationship, the bowl gasket assembly 21 is moved downwardly until the projection 32 engages an inwardly biased tab 50 as illustrated in FIG. 12. Further movement of the bowl gasket assembly 21 into the adapter ring 41 will cause the projection 32 to move the tab 50 outwardly as illustrated in FIG. 13 until the tab 50 snaps over the projection 32 as illustrated in FIG. 14.

Figure 15:
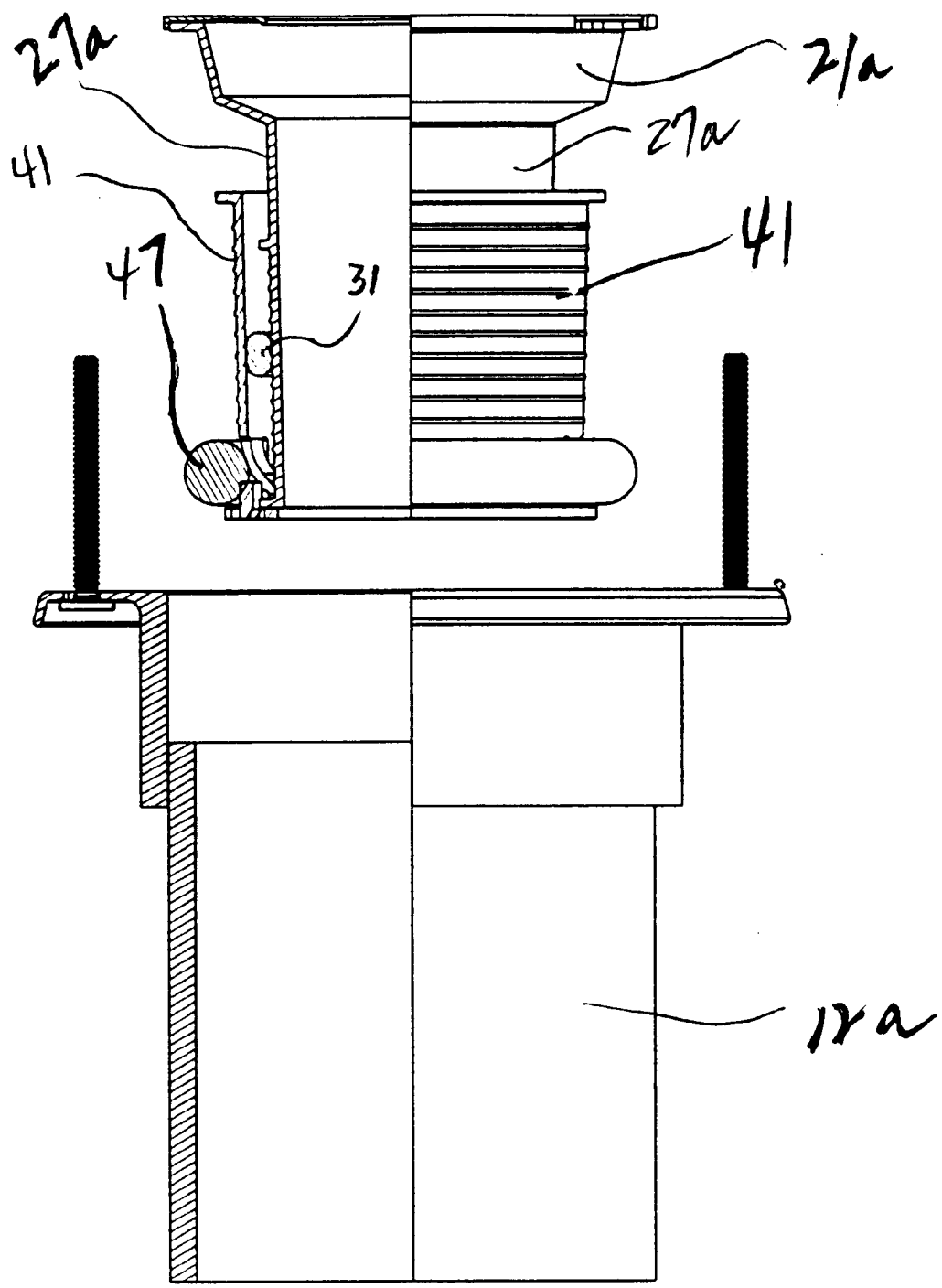
FIG. 15 is a side elevation view similar to FIG. 9 but illustrating the adapter of FIG. 9 prior to installation.
Figure 16:
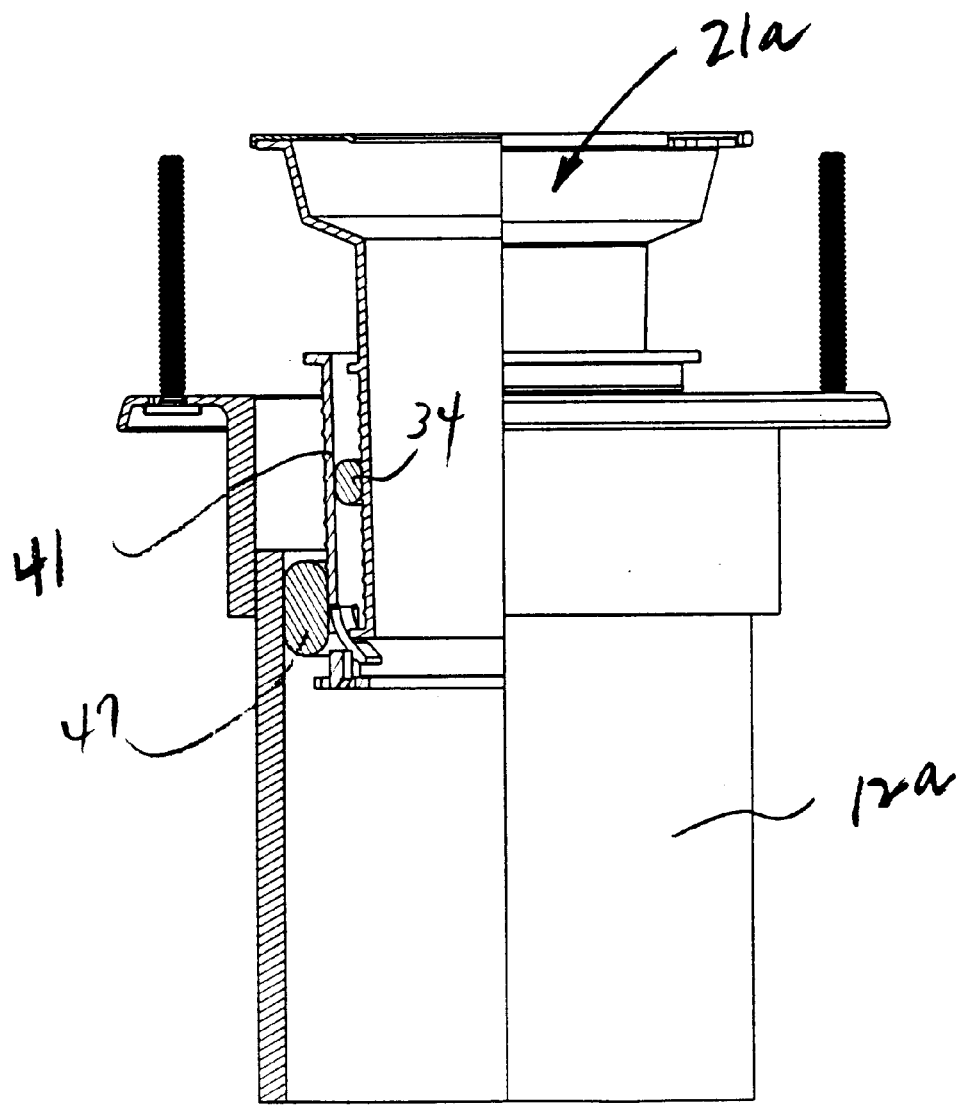
FIG. 16 is a side elevation view partially in section of the bowl gasket assembly including the adapter ring in an initial step of installation.
Figure 17:
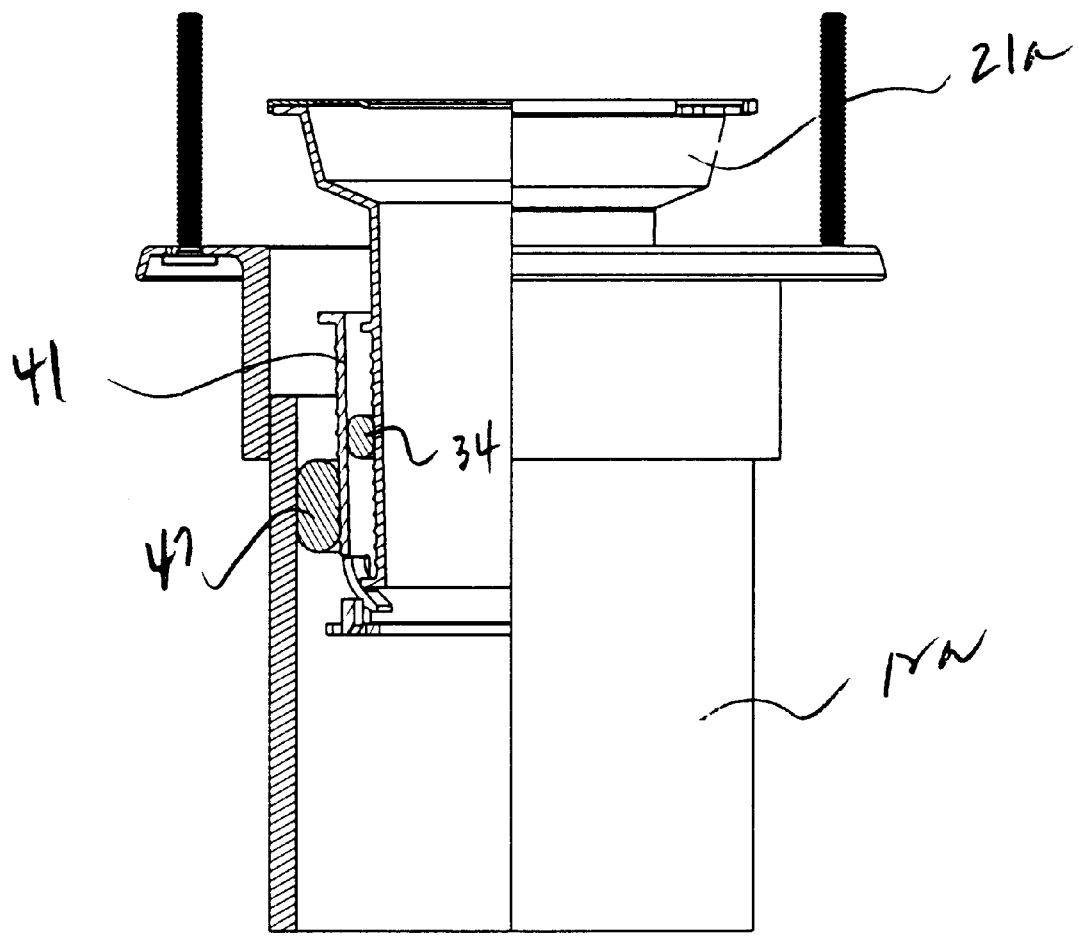
FIG. 17 is a side elevation view partially in section of the bowl gasket assembly including the adapter ring in an intermediate step of installation.
Figure 18:
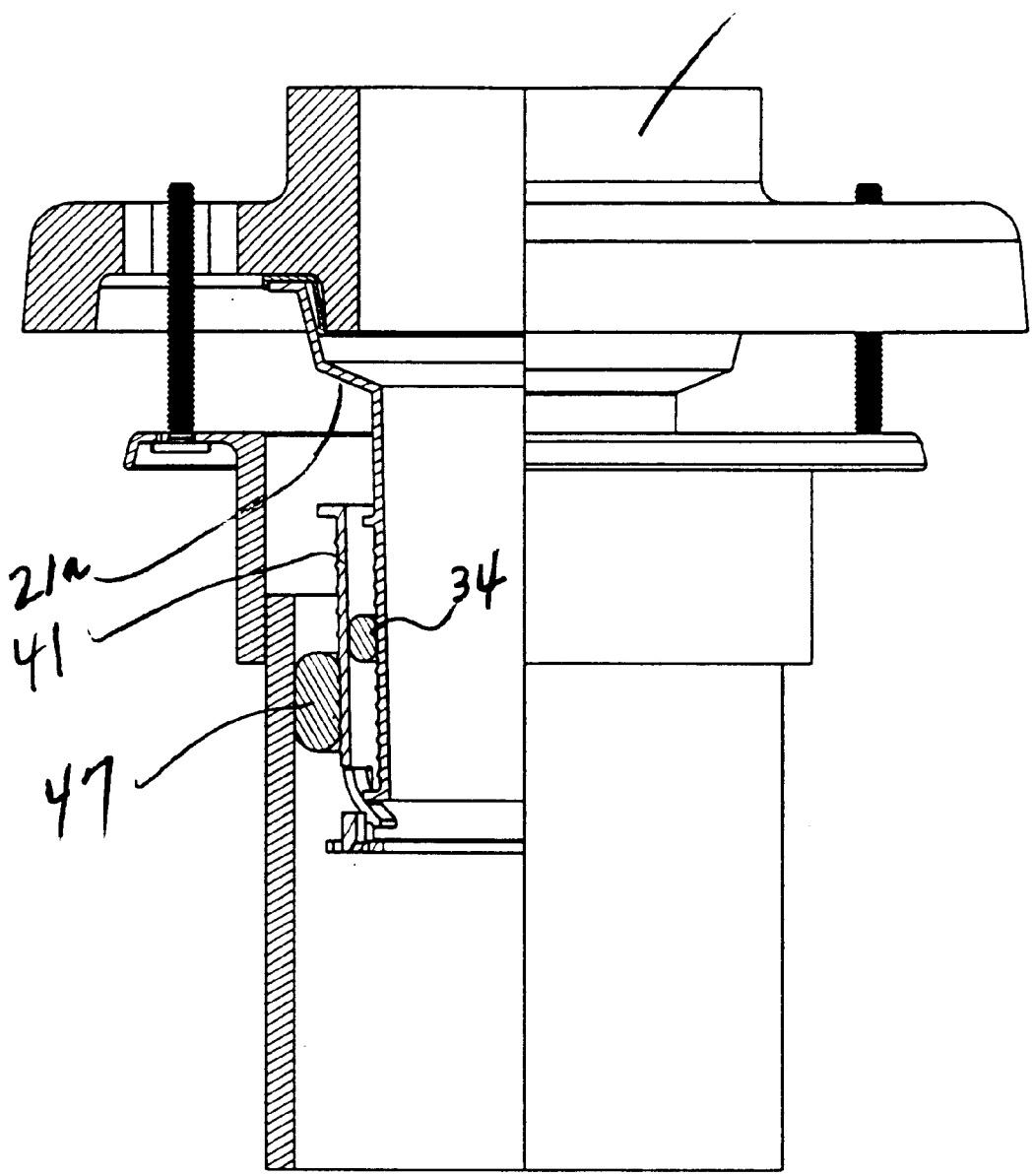
FIG. 18 is a side elevation view partially in section of the bowl gasket assembly including the adapter ring with the toilet horn in an initial state of installation.
Figure 19:
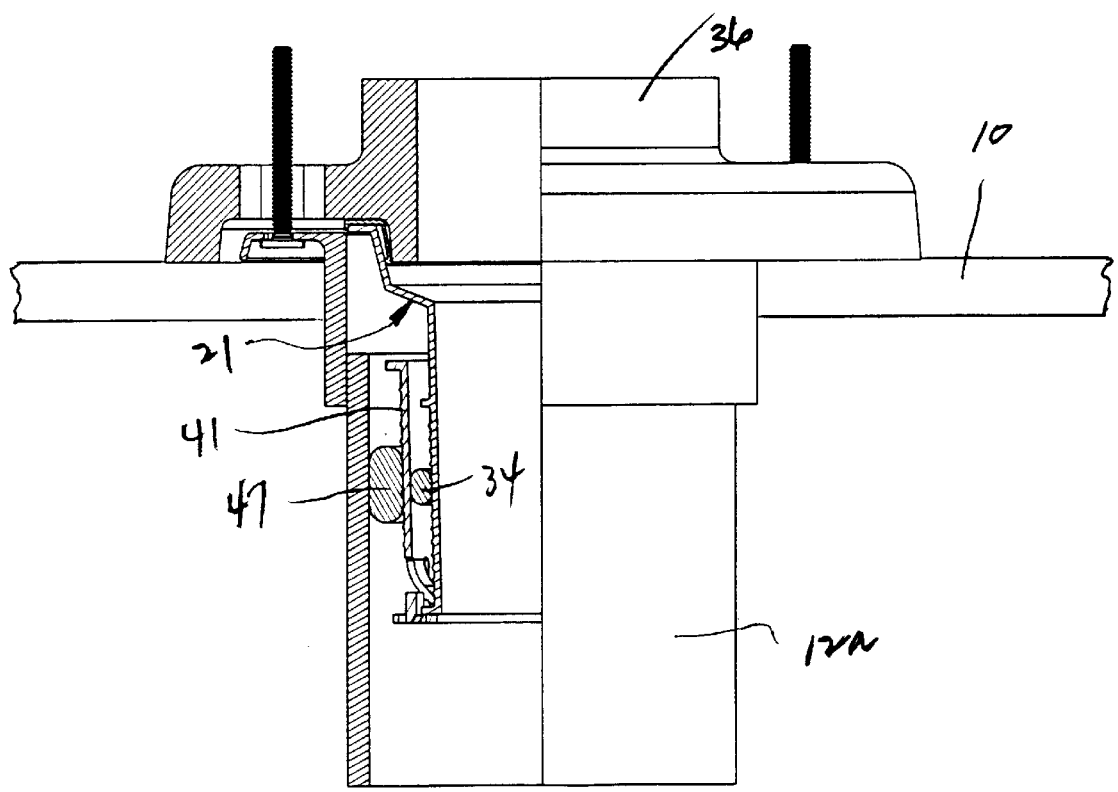
FIG. 19 is a side elevation view partially in section of the toilet bowl, bowl gasket assembly including the adapter ring in a final step of installation.
Figure 20:
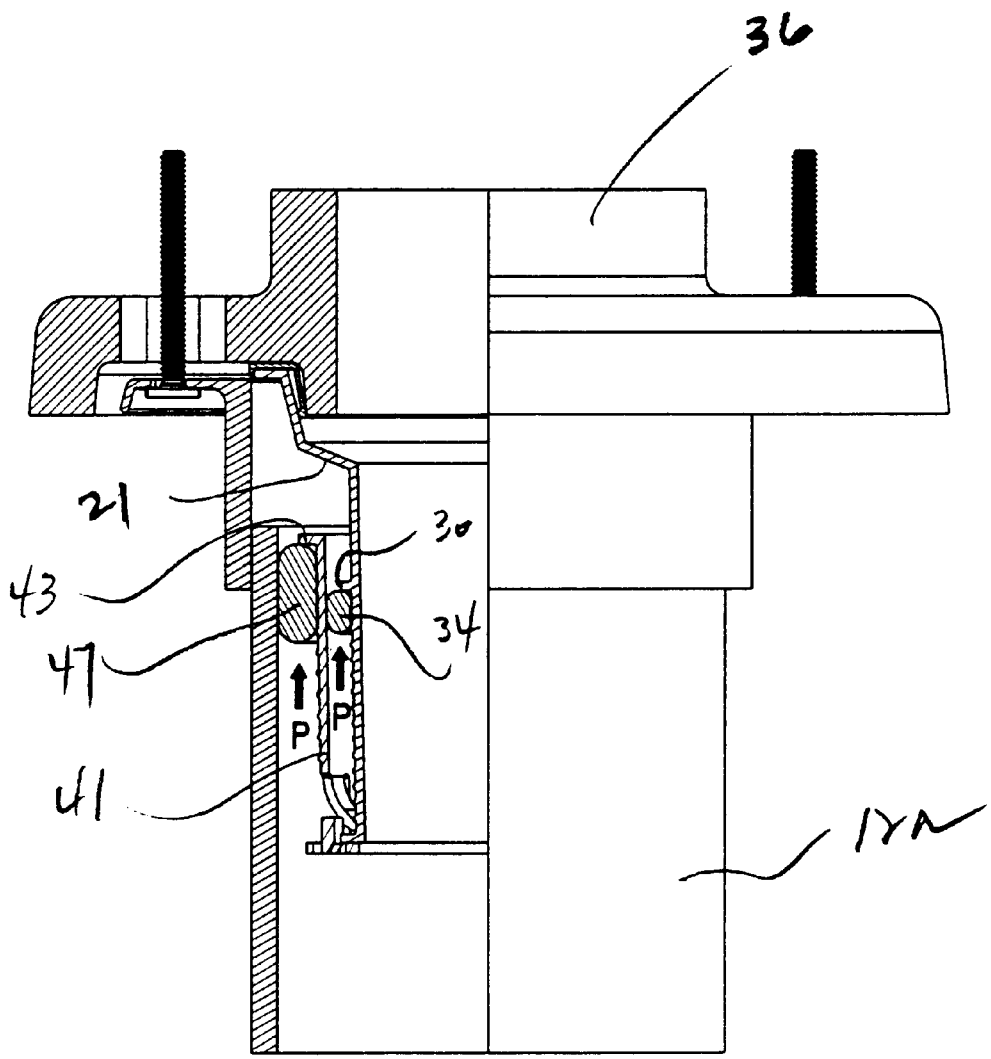
FIG. 20 is a side elevation view partially in section of the toilet bowl, bowl gasket assembly including the adapter ring with an associated adapter gasket finally positioned in response to system pressure.

Once the adapter ring 41 is fixed to the housing 27a the resulting bowl gasket assembly 21a can be inserted into the larger sewer pipe 12a as illustrated in FIG. 15. From this position, the bowl gasket assembly 21a with the adapter ring 41 can be moved progressively into the sewer pipe 12a as illustrated in FIGS. 16 and 17. After the bowl gasket assembly 21 a is at least partially inserted, the toilet horn 36 can be mounted on the bowl gasket assembly 21a, as illustrated in FIG. 18, in the manner previously discussed. Fully seating the toilet horn 36 on the floor 10 will move the toilet horn 36, bowl gasket assembly 21, adapter ring 41, and sewer pipe 12a into a final installed relationship, as illustrated in FIG. 19. If system pressure is applied to this combination, it will tend to move the gasket ring 34 and adapter gasket ring 47 upwardly against the associated shoulders 30 and 43 as illustrated in FIG. 20.

A further embodiment of the invention, illustrated in FIGS. 21–23, includes one or more shims or spacers 52 which are sized to fit over the lower housing 27 and to ultimately extend radially outwardly of the top housing 23. In this location the spacer(s) 52 engage the flange associated with the top housing 23 to hold the bowl gasket assembly 21 in a more elevated relationship with respect to the adapter 14.

Figure 24:
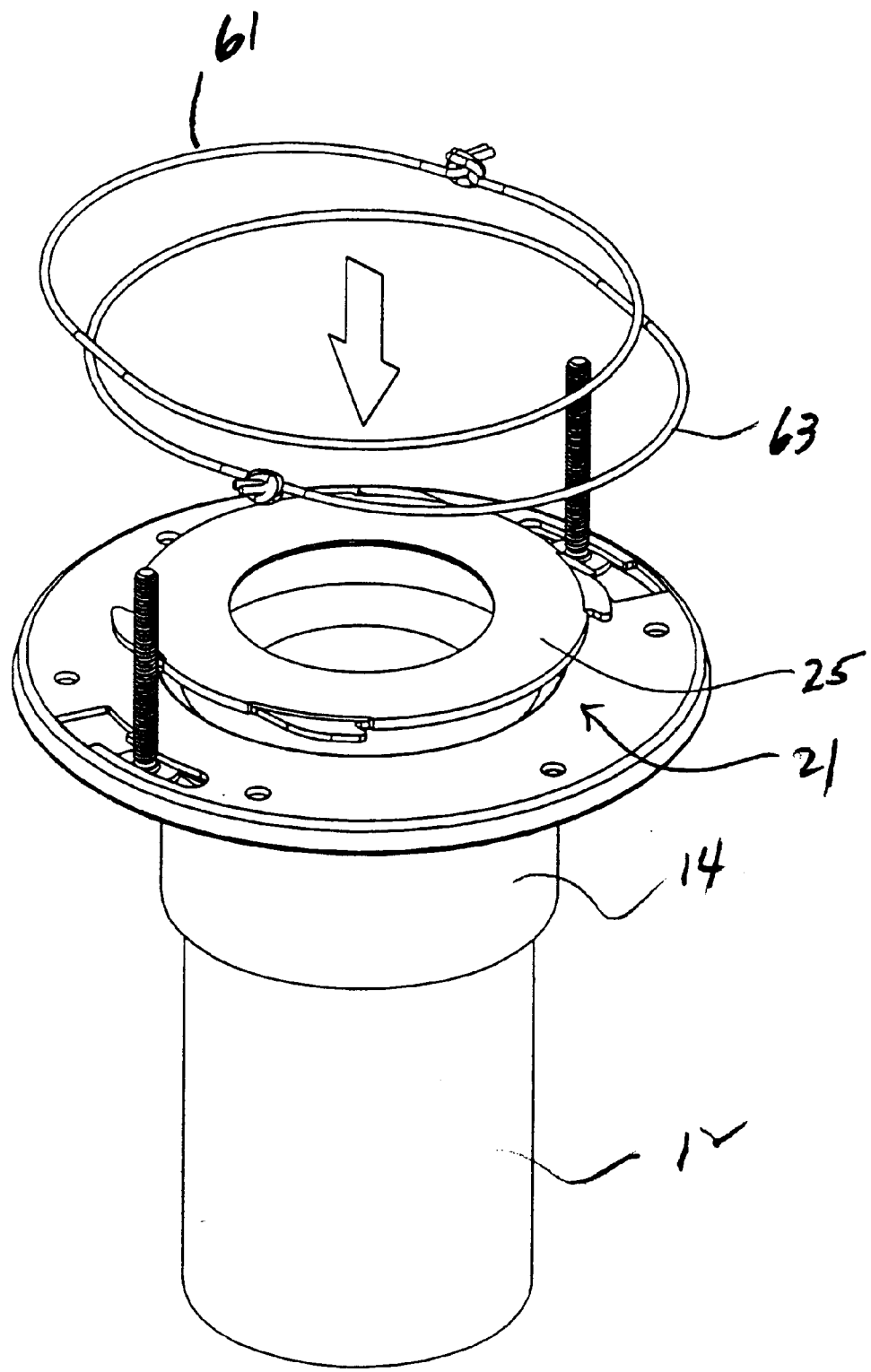
FIG. 24 is a top side perspective view of an initial step in the process for removing an installed bowl gasket assembly.
Figure 25:
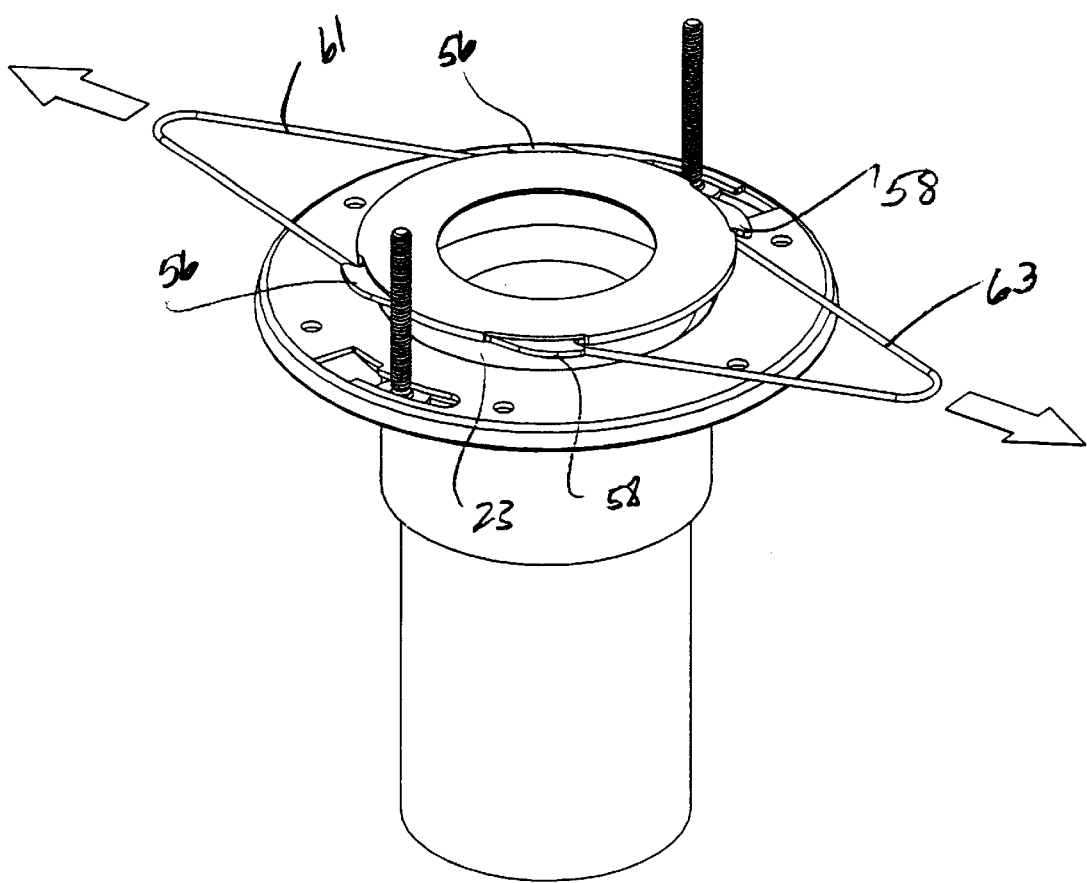
FIG. 25 is a top side perspective view of an intermediate step in the process for removing an installed bowl gasket assembly.
Figure 26:
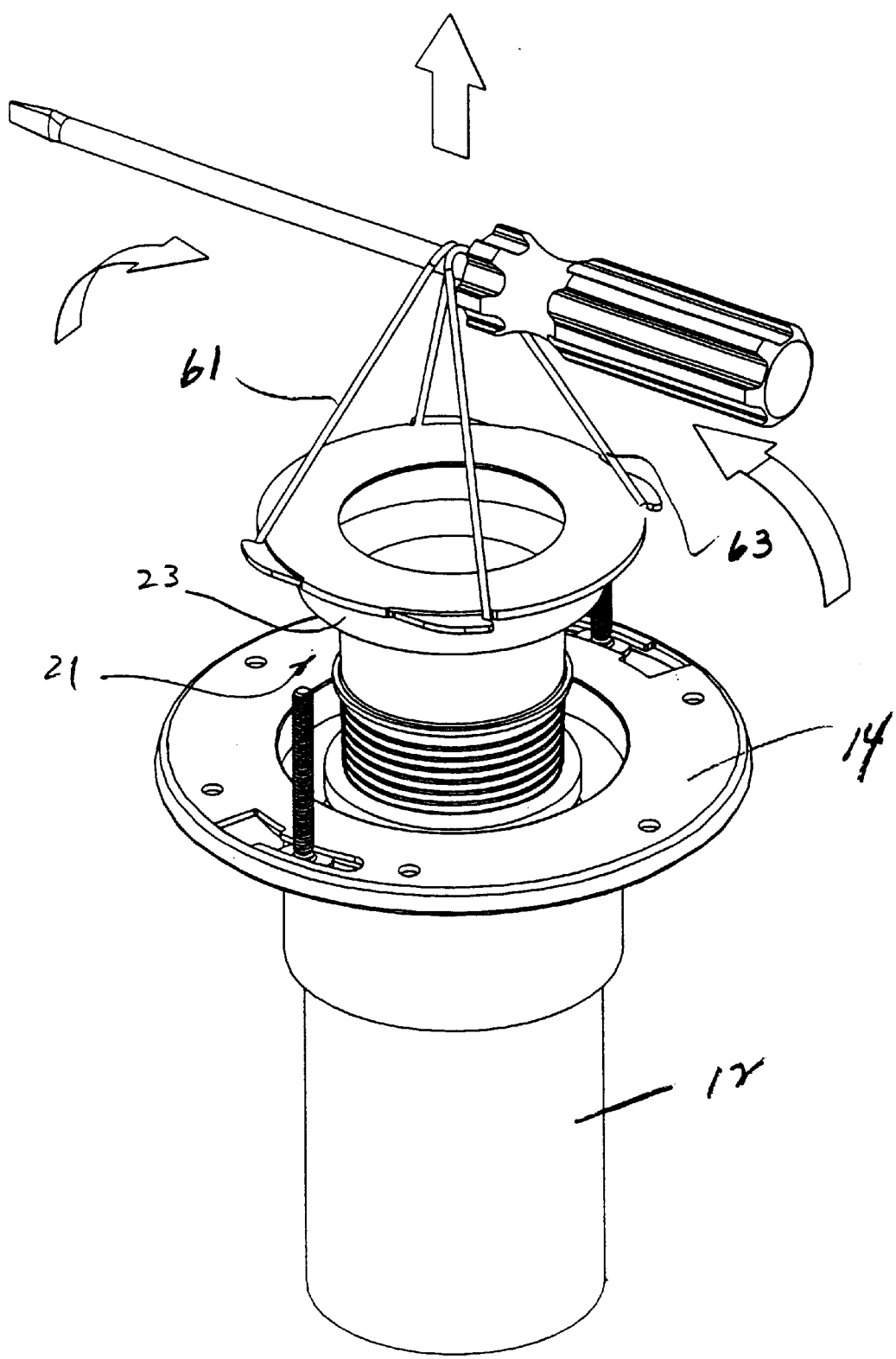
FIG. 26 is a top side perspective view of a final step in the process for removing an installed bowl gasket assembly.

Another feature associated with the present invention relates to the process for removing the bowl gasket assembly 21 once it has been installed within the sewer pipe 12. To facilitate this removal, a preferred embodiment includes four engagement members or hooks 56 and 58 which extend radially outwardly from the top housing 23. A pair of loops can be disposed over the top gasket 25 to engage the top housing 23 beneath the associated hooks 56 and 58 as illustrated in FIG. 24. For example, referring to FIG. 25, a loop 61 can engage the top housing 23 beneath the hooks 56 while a loop 63 can engage the top housing 23 beneath the loops 58. Pulling upwardly on these loops 61 and 63 will cause them to engage the respective hooks 56 and 58 as illustrated in FIG. 26. Further upward movement of the loops 61, 63 will withdraw the bowl gasket assembly 21 from the sewer pipe 12.

In a further embodiment of the invention illustrated in FIGS. 27–29, the lower housing 27 is provided with a plurality of bumps 65 which are individually formed in either symmetrical or random locations. Each of the bumps 65 extends generally outwardly of the cylindrical housing 27. The bumps 65 can be longitudinal in configuration and oriented generally circumferentially of the housing 27, with an axial cross-section such as that illustrated in FIG. 29.

In this view, the bumps 65 are shown to have a generally V-shaped crosssection with ramped sides 67 leading to an outer-most edge 69. This cross-sectional configuration is of particular advantage in promoting and facilitating the desired rolling relationship between the gasket ring 34 and the housing 27. As the ring 34 moves axially along the cylindrical housing 27, it encounters the individual bumps 65 with a generally parallel orientation. Further axial movement of the gasket ring 34 causes it to move outwardly along the ramped side 67 as it stretches circumferentially. Ultimately the ring contacts the outer-most edge 69 of the bump 65, where the highest pressure occurs between the ring 34 and the housing 27. This increased pressure engages the ring 34 so that further axial movement is accomplished not by sliding but by the preferred rolling of the toroidal ring 34.

The bumps 65 are not intended to seat the ring 34, but rather to promote, facilitate and ensure its rolling relationship with the housing 27 as the bowl gasket assembly 21 is inserted into the sewer pipe 12. Of course the bumps 65 can be provided with other cross-sectional configurations providing point, line or surface contact with the ring 34. By engaging this gasket ring 34 along its inner-most diameter, the bumps 65 inhibit any sliding movement of the gasket ring 34 while promoting the desired rolling relationship between the gasket ring 34 and the housing 27.

Although the foregoing discussion has been directed primarily to toilets and sewer pipes, it will be apparent that the concept of this invention would equally apply to any bathroom fixture and any associated drain or sewer pipe. For example, the invention would apply to other bathroom fixtures forming a seal with a drain pipe in the floor such as a bathtub or bidet. It would also apply equally to bathroom fixtures associated with drain pipes in the walls such as sinks and urinals.

These are but a few of the many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but also in the sense of any special definition used in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. A gasket assembly adapted to form a sealing relationship between an outlet of a bathroom fixture and a sewer pipe, comprising:
    an upper housing adapted to form a seal with the outlet, the upper housing including a first top gasket disposed in a radial plane;
    a lower housing having an outer surface extending along an axis and being sized and configured for insertion into the sewer pipe;
    a second toroidal gasket disposed in sealing engagement with the outer surface of the lower housing and being adapted to form a seal with an inner surface of the sewer pipe;
    the second toroidal gasket being adapted to roll along the outer surface when the lower housing is inserted into the sewer pipe;
    the outer surface is a first outer surface and the lower housing further comprising:
        a first cylinder having an inner surface and the first outer surface;
        a second cylinder disposed inwardly of the first cylinder and having a second outer surface;
        a third gasket disposed in sealing relationship with the inner surface of the first cylinder and the second outer surface of the second cylinder, and
    the second toroidal gasket is located on the first outer surface and is in contact with the sewer pipe.

2. The gasket assembly recited in claim 1, further comprising:
    a plurality of projections extending outwardly of the outer surface to engage the toroidal gasket and to facilitate the rolling of the toroidal gasket along the outer surface of the lower housing.

3. The gasket assembly recited in claim 1, wherein the third gasket is toroidal in configuration.

4. The gasket assembly recited in claim 3, further comprising:
    a latch for releasably locking the first cylinder to the second cylinder with the third gasket disposed therebetween.

5. The gasket assembly recited in claim 1, further comprising:
    a plurality of engagement members disposed on the upper housing, the engagement members being engagable when the gasket assembly is operatively disposed in the sewer pipe, to facilitate removal of the gasket assembly from the sewer pipe.

6. The gasket assembly recited in claim 5 wherein the engagement members comprise a plurality of hooks.

7. The gasket assembly recited in claim 1, wherein the lower housing comprises a shoulder to stop upward movement of the toroidal gasket.

8. A gasket assembly adapted to form a sealing relationship between an outlet of a bathroom fixture and a sewer pipe, comprising
    an upper housing having a portion disposed in a radial plane and adapted to form a seal with the outlet;
    a lower housing coupled to the upper housing;
    a cylinder included in the lower housing and having an outer surface with a generally constant diameter;
    a gasket disposed in a rolling relationship with the outer surface of the cylinder and in contact with an inner surface of the sewer pipe to form a seal;
    the cylinder is a first cylinder having an inner surface, the gasket is a first gasket, and the gasket assembly further comprises:

a second cylinder having an outer surface and being disposed inwardly of the first cylinder; and a second gasket disposed in a sealing relationship with the inner surface of the first cylinder and the outer surface of the second cylinder.

9. The gasket assembly recited in claim 8, wherein:

the first gasket has a toroidal configuration and properties for rolling in sealing engagement with the outer surface of the first cylinder; and the second gasket has a toroidal configuration and properties for rolling in sealing engagement with the inner surface of the first cylinder and the outer surface of the second cylinder.

10. The gasket assembly recited in claim 8, wherein the lower housing comprises a shoulder to stop upward movement of the gasket.

11. A method for connecting or sealing a bathroom fixture to a sewer pipe, comprising the step of:

providing a gasket assembly with an upper housing, a first cylinder having an outer surface with a generally constant diameter, a second cylinder having an outer surface and being disposed inwardly of the first cylinder and a first toroidal gasket disposed on the outer surface of the first cylinder;

providing a second toroidal gasket disposed in a sealing relationship with an inner surface of the first cylinder and the outer surface of the second cylinder;

mounting the gasket assembly on the sewer pipe;

during the mounting step contacting the sewer pipe with the first toroidal gasket;

during the mounting step rolling at least one of the first gasket and the second gasket axially in a continuous sealing relationship with the first cylinder; and placing the bathroom fixture in a sealing relationship with the upper housing of the gasket assembly.

12. The method recited in claim 11, wherein the sewer pipe has an inner surface and the method further comprises the steps of:

during the contacting step placing the gasket in a sealing relationship with the inner surface of the sewer pipe.

13. The method recited in claim 11, further comprising the step of stopping the gasket with a shoulder formed on the first cylinder.

\* \* \* \* \*